(12) United States Patent
Bridge

(10) Patent No.: US 8,766,758 B2
(45) Date of Patent: Jul. 1, 2014

(54) HIGH-FREQUENCY TRANSFORMER

(75) Inventor: Matthew Bridge, Troy, OH (US)

(73) Assignee: Solid State Controls, LLC, Columbus, OH (US)

( * ) Notice: Subject to any disclaimer, the term of this patent is extended or adjusted under 35 U.S.C. 154(b) by 0 days.

(21) Appl. No.: 13/587,240

(22) Filed: Aug. 16, 2012

(65) Prior Publication Data

US 2013/0043964 A1 Feb. 21, 2013

Related U.S. Application Data

(60) Provisional application No. 61/525,160, filed on Aug. 18, 2011.

(51) Int. Cl.
*H01F 27/24* (2006.01)
*H01F 27/26* (2006.01)
*H01F 21/06* (2006.01)

(52) U.S. Cl.
USPC ........... 336/212; 336/210; 336/214; 336/216; 336/131

(58) Field of Classification Search
CPC ........................... H01F 27/263; H01F 27/2866
USPC ....................................................... 336/212
See application file for complete search history.

(56) References Cited

U.S. PATENT DOCUMENTS

| 4,947,312 A | 8/1990 | Tsuruoka et al. | |
| 8,125,304 B2 * | 2/2012 | Brubaker et al. | 336/90 |
| 2004/0257190 A1 * | 12/2004 | Peck et al. | 336/212 |
| 2008/0180205 A1 | 7/2008 | Tsai et al. | |
| 2009/0066290 A1 * | 3/2009 | Altekruse et al. | 320/108 |

FOREIGN PATENT DOCUMENTS

| EP | 0293617 A1 | 12/1988 |
| EP | 0590741 A1 | 4/1994 |

OTHER PUBLICATIONS

European Search Report for counterpart European application No. EP12180904, dated Dec. 6, 2012.

* cited by examiner

*Primary Examiner* — Alexander Talpalatski
*Assistant Examiner* — Ronald Hinson
(74) *Attorney, Agent, or Firm* — James R. Eley; Michael A. Forhan; Eley Law Firm Co., LPA

(57) ABSTRACT

A high-frequency transformer includes a plurality of cores having a central leg, the cores being arranged to form core windows that are separated by the central legs. A primary winding has a predetermined length of electrically conductive wire that is wound about the central legs and extends through each of the core windows. One or more secondary windings extend through each core window, generally adjacent to the primary winding. The core windows are sized and shaped to provide a predetermined amount of leakage inductance between the primary and secondary windings, and are further adapted to provide a path for cooling air through an interior portion of the transformer.

15 Claims, 4 Drawing Sheets

HIGH-FREQUENCY TRANSFORMER

CROSS-REFERENCE TO RELATED APPLICATIONS

This application claims priority to U.S. provisional application 61/525,160, filed Aug. 18, 2011, the contents of which are hereby incorporated by reference.

FIELD

The present invention relates generally to a high-frequency transformer for use in power supply systems, such as uninterruptible power supplies, inverter power supplies and battery chargers.

BACKGROUND

An uninterruptible power supply (UPS) is an electrical apparatus that provides emergency power to a load when the input power source, typically the utility mains, fails. A UPS differs from an auxiliary or emergency power system or standby generator in that it will provide instantaneous or near-instantaneous protection from input power interruptions by means of one or more attached batteries and associated electronic circuitry. While not limited to protecting any particular type of equipment, a UPS is often used to protect computers, data centers, telecommunication equipment and other electrical equipment where an unexpected power disruption could cause injuries, fatalities, serious business disruption or data loss.

An inverter is an electrical device that converts direct current (DC) to alternating current (AC). The converted AC can be established at any desired voltage and frequency with the use of appropriate transformers, switching, and control circuits. Solid-state inverters have no moving parts and are used in a wide range of applications, from small switching power supplies in computers to large electric utility high-voltage direct current applications that transport bulk power. Inverters are commonly used to supply AC power to loads from DC power sources.

A battery charger is a device that is used to transfer energy into a secondary cell or a rechargeable battery by forcing an electric current through it. In some cases battery chargers are designed for high-efficiency conversion of incoming commercial AC mains power to DC power for charging large banks of station batteries, while supplying power to continuous DC loads such as inverters. Such battery chargers are often used in conjunction with UPS systems, as well as a standalone device for battery charging only applications.

Due their criticality, there is a continuing need to increase the efficiency and reliability of UPS systems, inverters and battery chargers.

SUMMARY

A high-frequency transformer having a predetermined amount of leakage inductance is disclosed according to an embodiment of the present invention. The leakage inductance may be utilized as a resonant inductor in a resonant power conversion system, thereby eliminating the need for a separate resonant inductor in the system. The high-frequency transformer also includes a plurality of windows that provide for the flow of cooling air through the interior of the transformer.

An object of the present invention is a high-frequency transformer. The high-frequency transformer includes a plurality of cores having a central leg, the cores being arranged to form core windows that are separated by the central legs. A primary winding has a predetermined length of electrically conductive wire that is wound about the central legs and extends through each of the core windows. One or more secondary windings extend through each core window, generally adjacent to the primary winding. The core windows are sized and shaped to provide a predetermined amount of leakage inductance between the primary and secondary windings, and provide a path for cooling air.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
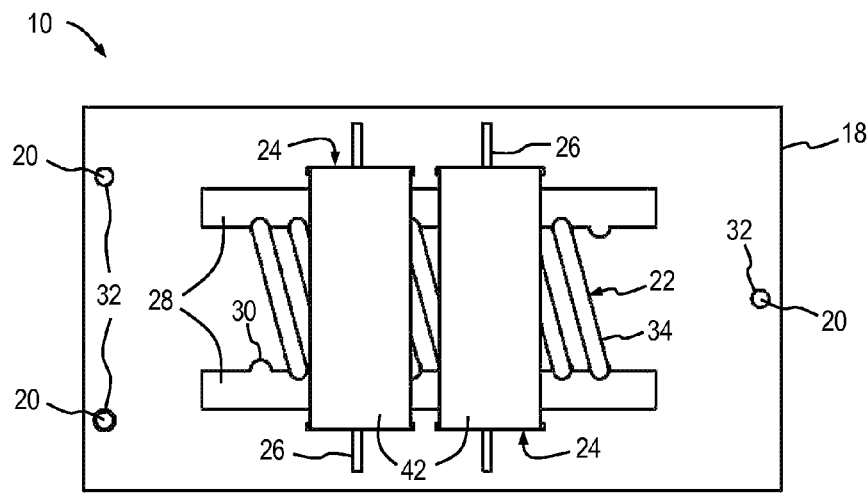
FIG. 1 is a bottom plan view of a high-frequency transformer according to an embodiment of the present invention.
Figure 2:
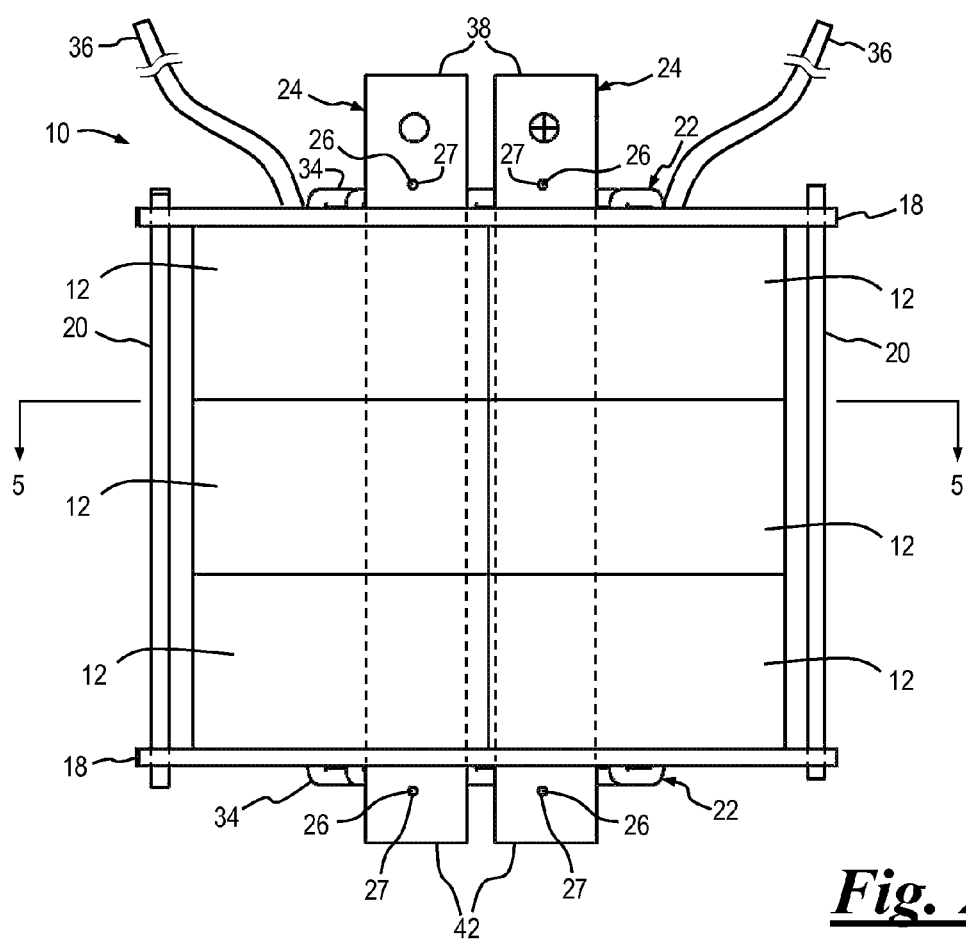
FIG. 2 is a side elevational view of the high-frequency transformer of FIG. 1.
Figure 3:
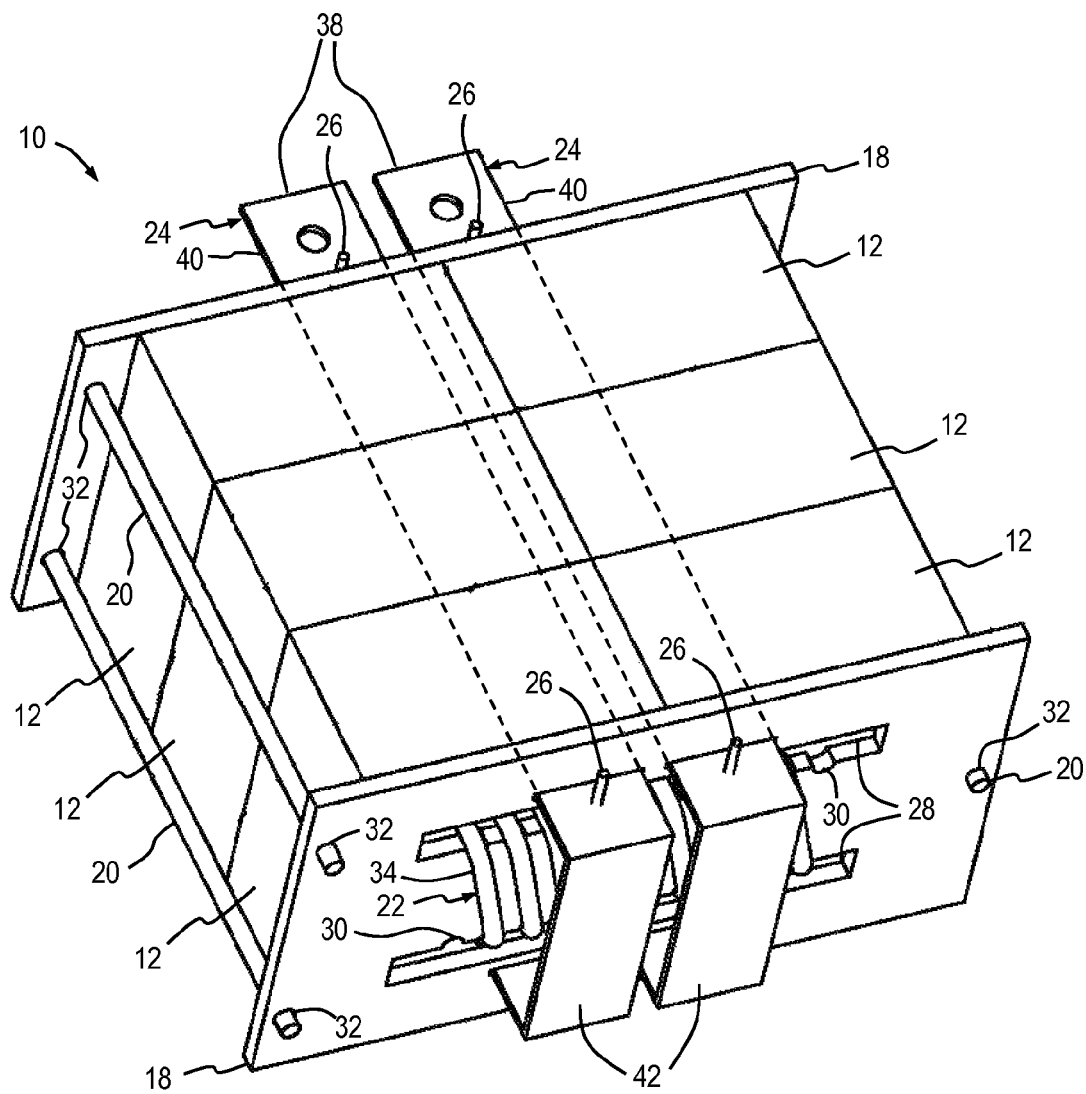
FIG. 3 is a perspective view of the high-frequency transformer of FIGS. 1 and 2.
Figure 4:
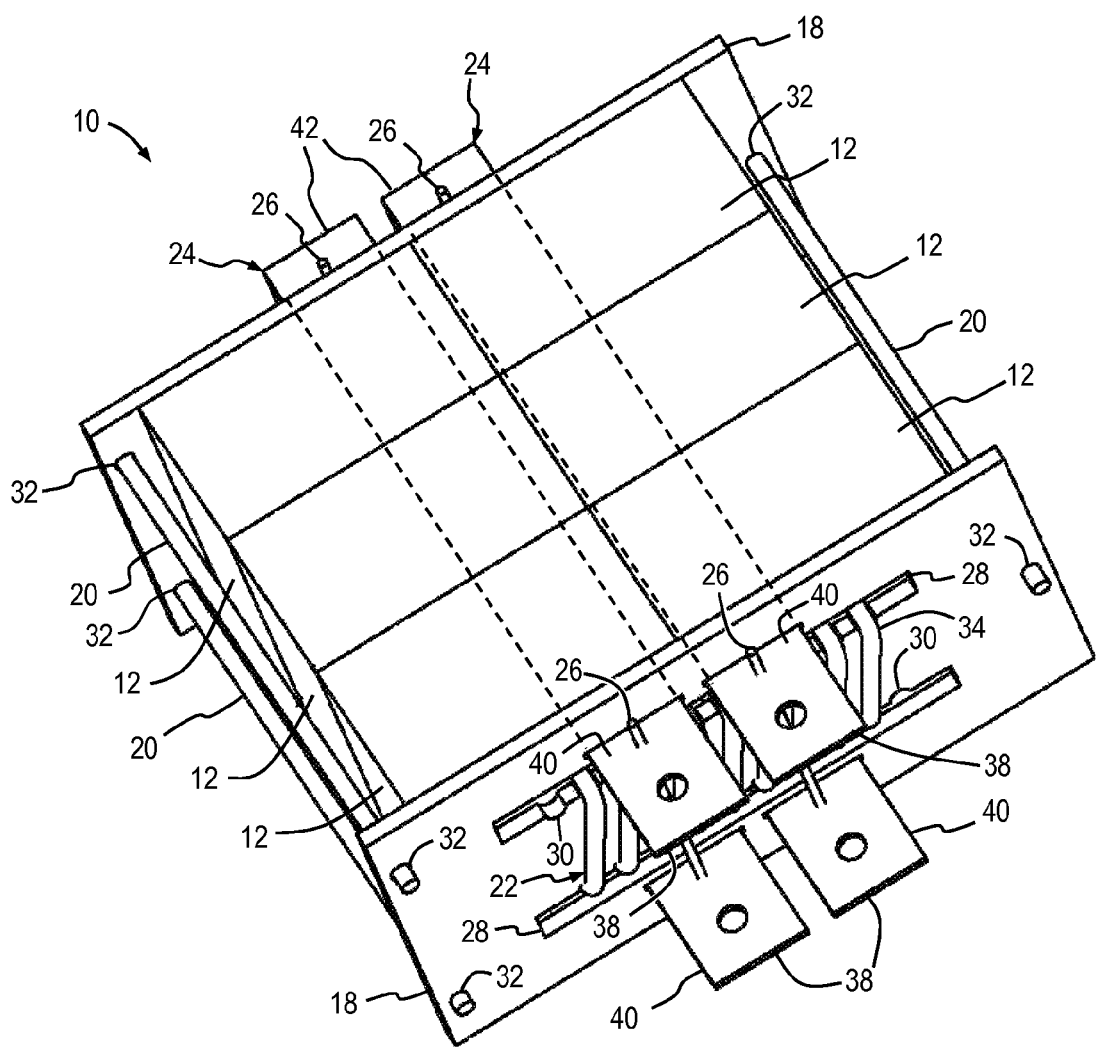
FIG. 4 is another perspective view of the high-frequency transformer of FIGS. 1 and 2.

The general arrangement of a high-frequency transformer 10 is shown in FIGS. 1 through 5 according to an embodiment of the present invention. Transformer 10 includes a plurality of cores 12 that are stacked together and arranged to form a pair of windows 14 divided by a central leg 16 of the cores. A pair of spaced-apart formers 18 are aligned with each other at opposing ends of the stacked cores 12 and are retained against the cores by a plurality of former rods 20. A primary winding 22 is wound about central legs 16 and formers 18. One or more generally U-shaped secondary windings 24 extend through formers 18 and windows 14, generally adjacent to primary winding 22. A plurality of secondary shaper rods 26 retain secondary windings 24 in place on transformer 10 and aid to hold the shape of the secondary windings.

Figure 5:
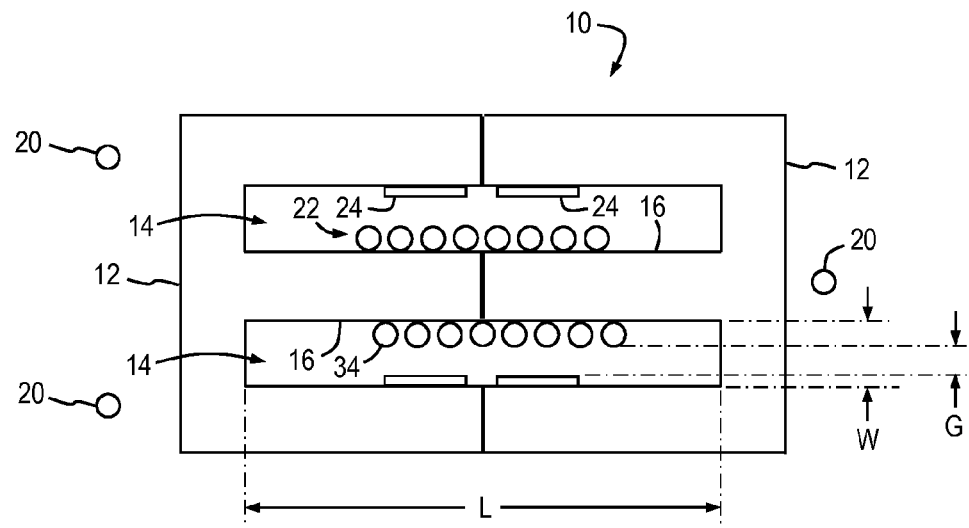
FIG. 5 is a view in section of the high-frequency transformer of FIG. 2.

In one embodiment of the present invention cores 12 are made from a suitable ferrite material and are formed generally into an "E"-shape. Preferably, cores 12 are arranged such that pairs of E-shaped elements face one another as shown in FIG. 5. The pairs of cores 12 are stacked atop one another, forming windows 14 divided by central legs 16. Cores 12 may be made from any suitable magnetic material having properties of relatively high magnetic permeability coupled with relatively low electrical conductivity.

Formers 18 are electrically insulative and generally planar with a pair of spaced-apart slots 28 extending therethrough, the slots being generally aligned with windows 14. In some embodiments slots 28 include a plurality of wire guides 30. Formers 18 further include a set of openings 32 into which former rods 20 are fitted. Formers 18 are preferably made from an electrically insulative material such as, without limitation, plastic, fiberglass and engineered composites.

Former rods 20 are of a sufficient size and shape to extend between formers 18 and through openings 32 of the formers. Former rods 20 may be made from any suitable material including, but not limited to, plastic, fiberglass and engineered composites. Former rods 20 may be secured to openings 32 by an interference fit in the openings, adhesive, or a combination thereof.

Primary winding 22 is made from a predetermined length of suitable electrically conductive, insulated transformer wire 34. Transformer wire 34 is wound through windows 14, about central leg 16 and formers 18. Transformer wire 34 may also be wound such that the transformer wire is placed into wire guides 30 of formers 18 in order to control the shape of primary winding 22 and the spacing of the transformer wire. Transformer wire 34 may be made from any suitable electrical wiring such as, without limitation, solid copper or "Litz" wire. Primary winding 22 may be terminated in a set of electrical connection terminals. Alternatively, opposing ends of transformer wire 34 may extend away from transformer 10 to form a set of primary leads 36 (shown only in FIG. 2 for clarity), the primary leads providing electrical connections to primary winding 22.

Secondary windings 24 are preferably formed as generally planar, generally U-shaped, electrically conductive straps 24 that extend through formers 18 and core windows 14, and positioned generally adjacent primary winding 22 within the core windows. Opposing ends 38 of each strap 24 form a pair of electrical connection terminals 40 at a first end of transformer 10 for electrical connection to secondary windings 24. An intermediate portion of each of the straps form bridges 42 at a second, opposing end of transformer 10. Secondary windings 24 may be made from any suitable material, such as copper.

Secondary shaper rods 26 extend generally orthogonally between the parallel arms of the "U-shaped" straps 24 proximate each former 18 and are secured to the arms by an interference fit with apertures 27 in the straps, adhesive, or a combination thereof. Secondary shaper rods 26 act to retain secondary windings 24 in place on transformer 10 and also aid to maintain the "U" shape of the secondary windings.

"Leakage inductance" is a property of an electrical transformer that causes a transformer winding to appear to have some inductance in series with the mutually-coupled transformer windings. This is due to imperfect coupling of the windings and the creation of leakage flux which does not link with all the turns of the winding. The leakage flux alternately stores and discharges magnetic energy with each electrical cycle. Although in many cases it is desirable to minimize leakage inductance of transformers, with reference to FIG. 5, in the present invention transformer 10 is configured such that a predetermined desired amount of leakage inductance is present. In particular, the size and shape of core windows 14 are configured to have a predetermined area by varying the dimensions of "L" and "W," resulting in a predetermined core window shape having an area that provides transformer 10 with a predetermined amount of leakage inductance between primary winding 22 and secondary windings 24. Likewise, the gap "G" between primary winding 22 and secondary windings 24 in core windows 14 may be varied to achieve a predetermined desired amount of leakage inductance between primary winding 22 and secondary windings 24. As noted above, leakage flux alternately stores and discharges magnetic energy with each electrical cycle. As a result, the leakage inductance effectively acts as an inductor in series in each of the primary and secondary circuits.

Figure 6:
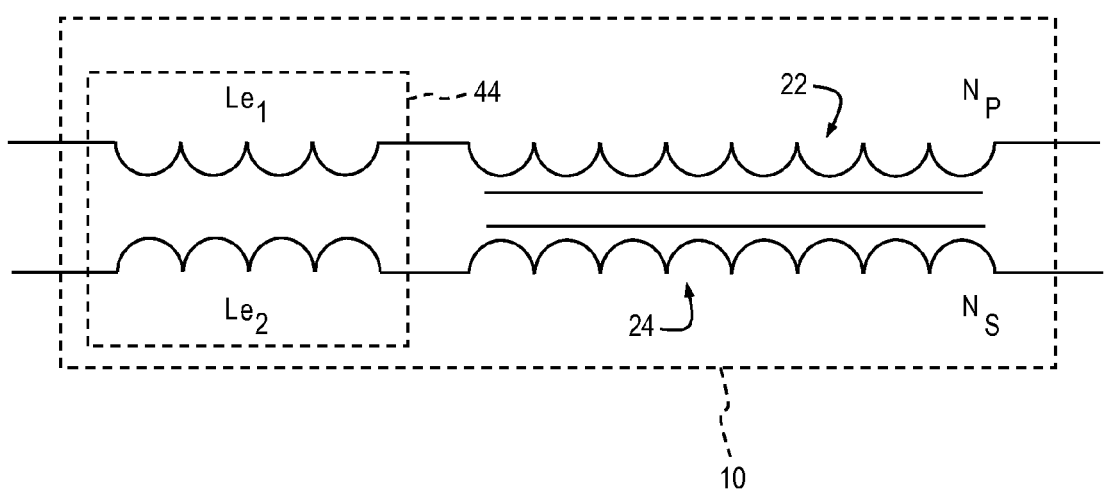
FIG. 6 is an electrical schematic of the high-frequency transformer of FIG. 1.

Referring now to FIG. 6, transformer 10 is represented schematically with primary winding 22 having a predetermined number of turns $N_P$ and secondary winding 24 having a predetermined number of turns $N_S$. Also shown is the leakage inductance, 44, comprising a first leakage inductance $Le_1$ present in primary winding 22 and a second leakage inductance $Le_2$ present in secondary winding 24. FIG. 10. Leakage inductance 44 may be utilized as a resonant inductor in a power conversion system, thereby eliminating the need for a separate resonant inductor.

The relatively large core windows 14 are preferably generally aligned with corresponding slots 28 in formers 18, the windows and corresponding slots providing a path for cooling air to flow through the interior of transformer 10 to aid in the reduction of "hot spots" generated in the interior of the transformer due to electric current flowing in primary 22 and secondary 24. In some embodiments the number of layers of wiring in primary and secondary windings 22, 24 respectively may also be minimized and/or spaced to further reduce the occurrence of hot spots.

Transformer 10 may be constructed using conventional materials, e.g., copper, ferrite and electrically insulative materials. The assembly of transformer 10 may also include planar and wound transformer construction methods. In some embodiments of the present invention cores 12 may be encased or enclosed. As a non-limiting example, the cores 12 may be wrapped in a flame-resistant, meta-aramid material such as NOMEX, available from E.I. du Pont de Nemours and Company of Wilmington, Del. The wrapping material may be secured to cores 12 with adhesive or high-temperature fiberglass tape.

While this invention has been shown and described with respect to a detailed embodiment thereof, it will be understood by those skilled in the art that changes in form and detail thereof may be made without departing from the scope of the claims of the invention.

What is claimed is:

1. A high-frequency transformer comprising:
a plurality of cores having a central leg, the cores being arranged to form a plurality of core windows separated by the central legs;
a pair of formers at opposing ends of the arranged cores, the formers including at least one slot therethrough, the slot being adjacent to and generally parallel with at least one corresponding core window;
a primary winding comprising a predetermined length of electrically conductive wire wound about the central legs and extending through each of the core windows, the primary winding further extending through the slots of the formers and being wrapped around an outer surface of the formers; and
at least one secondary winding, the at least one secondary winding extending through each core window, generally adjacent to the primary winding,
the core windows being sized and shaped to provide a predetermined amount of leakage inductance between the primary and secondary windings.

2. The high-frequency transformer of claim 1 wherein the core windows are adapted to permit the flow of cooling air through an interior portion of the high-frequency transformer.

3. The high-frequency transformer of claim 1, further comprising:
a plurality of openings extending through the formers; and
a plurality of former rods extending between the formers and through the openings of the formers, the former rods being secured to the formers.

4. The high-frequency transformer of claim 1 wherein the slots further include wire guides adapted to receive the wire of the primary winding.

5. The high-frequency transformer of claim 1 wherein the at least one secondary winding is generally U-shaped.

6. The high-frequency transformer of claim 5, further including secondary shaper rods extending generally orthogonally between parallel arms of the at least one secondary winding.

7. The high-frequency transformer of claim 1 wherein the primary winding further includes primary leads formed from opposing ends of the wire of the primary winding.

8. The high-frequency transformer of claim 1 wherein the at least one secondary winding further includes electrical connection terminals.

9. The high-frequency transformer of claim 1 wherein the cores are generally E-shaped.

10. The high-frequency transformer of claim 1 wherein the core windows have a predetermined length and width corresponding to a predetermined leakage inductance between the primary and secondary windings.

11. The high-frequency transformer of claim 1, further comprising a predetermined gap between the primary and secondary windings in the core windows, the gap corresponding to a predetermined leakage inductance between the primary and secondary windings.

12. The high-frequency transformer of claim 1 wherein the cores are wrapped in a flame-resistant, meta-aramid material.

13. A high-frequency transformer comprising:
a plurality of E-shaped cores having a central leg, the cores being arranged to form a pair of core windows separated by the central legs;
a pair of formers at opposing ends of the arranged cores, the formers including at least one slot therethrough, the slot being adjacent to and generally parallel with at least one corresponding core window;
a primary winding comprising a predetermined length of electrically conductive wire wound about the central legs and extending through each of the core windows, the primary winding further extending through the slots of the formers and being wrapped around an outer surface of the formers; and
a plurality of generally U-shaped secondary windings, each secondary winding extending through each core window, generally adjacent to the primary winding,
the core windows being sized and shaped to provide a predetermined amount of leakage inductance between the primary and secondary windings, and
the core windows being adapted to permit the flow of cooling air through an interior portion of the high-frequency transformer.

14. The high-frequency transformer of claim 13, further comprising:
a plurality of openings extending through the formers; and
a plurality of former rods extending between the formers and through the openings of the formers, the former rods being secured to the formers.

15. The high-frequency transformer of claim 13 wherein the core windows have a predetermined length and width corresponding to a predetermined leakage inductance between the primary and secondary windings.

* * * * *